(No Model.)
A. PERKINS.
ADJUSTING DEVICE FOR BICYCLES.
No. 524,951. Patented Aug. 21, 1894.
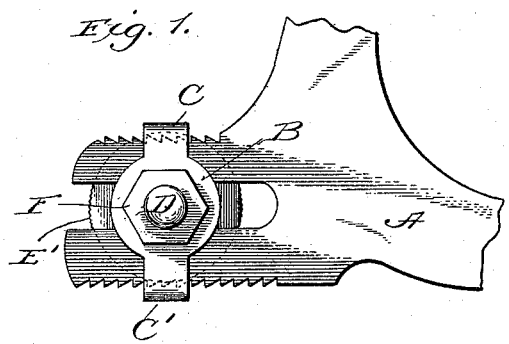
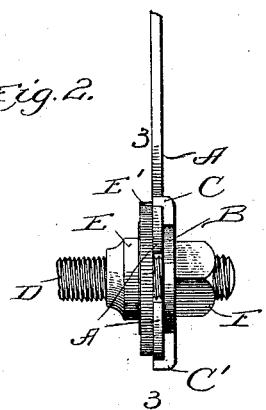
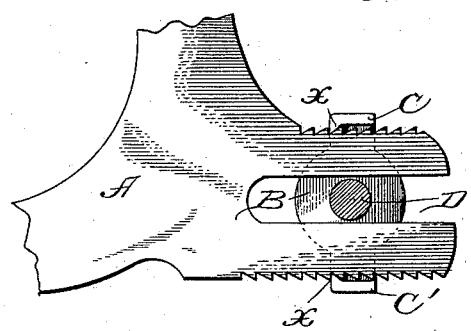
Witnesses:
Harry D. Rohrer.
Herbert Bradley.
Inventor:
Albert Perkins,
By Niles & Greener,
Attys.

UNITED STATES PATENT OFFICE.

ALBERT PERKINS, OF CHICOPEE, ASSIGNOR TO THE LAMB MANUFACTURING COMPANY, OF CHICOPEE FALLS, MASSACHUSETTS.

ADJUSTING DEVICE FOR BICYCLES.

SPECIFICATION forming part of Letters Patent No. 524,951, dated August 21, 1894.

Application filed May 26, 1894. Serial No. 512,564. (No model.)

*To all whom it may concern:*

Be it known that I, ALBERT PERKINS, a citizen of the United States, residing at Chicopee, in the county of Hampden and State of Massachusetts, have invented certain new and useful Improvements in Adjusting Devices for Bicycles; and I do hereby declare the following to be a full, clear, and exact description of the invention, such as will enable others skilled in the art to which it appertains to make and use the same.

The invention relates to devices especially intended for adjusting the rear wheel, to compensate variations in the length of the chain and its object is to prevent accidental change of adjustment, to strengthen the plate which holds the axle, to avoid the necessity of especially adjusting the wheel to bring it again into, or parallel to, the central plane of the machine, to lessen the usual number of parts and in a slight degree the weight, and with simplicity to obtain also the appearance of simplicity and compactness.

In the drawings,—Figure 1 is a side elevation of a portion of a rear fork, the axle carried thereby, and the adjusting mechanism. Fig. 2 is a rear view of the same parts. Fig. 3 is a section on the line 3—3, Fig. 2, looking to the right.

The plate which forms the rear part of the frame has a rearwardly projecting portion A, which is slotted inward from the rear parallel to its lateral edges, and against the outer side of this plate rests a steel washer B whose central aperture registers with the slot and which is provided above and below with broad, flat arms C, C'. The ends of these arms are bent inward to fit closely over the lateral margins of the plate, thus forming a channel in which the slotted portion of the plate is confined. Each of the edges named is provided with a series of notches, and each of the in-bent arm ends is bent again inward at its side to form a projection or tooth X which normally lies in one of the corresponding notches and prevents the washer from sliding along the slot. If however, the washer be moved perpendicularly outward from the plate, the teeth are withdrawn from the notches.

An axle D is passed through the slot in the plate and the central aperture in the washer, and upon the axle just within or against the inner side of the plate is fixed a stop,—shown as the ball bearing cone E, working upon the axle, which is threaded, and provided with a broad flange E', milled upon its outer edge to facilitate rotation,—which adjusts it.

Upon the outer, threaded end of the axle is placed a nut F which clamps the washer and plate between itself and the stop. Evidently if the nut is screwed home, with the teeth of the washer in the notches, the axle is firmly fixed and can be moved only by force sufficient to break the parts; but if it be unscrewed to a distance equal to the full thickness of the plate A, the teeth may be withdrawn, the axle moved along in the slot and the chain made more or less taut; or if the chain be freed, by separation or otherwise, the wheel and axle may be withdrawn from the frame.

When the wheel has been placed in the desired position, the washer is again pressed toward the plate, the teeth entering any notches with which they may register, and the nut, which has not necessarily been removed at all, is again screwed snugly against the washer and the whole is in working condition. The rear faces of the notches are preferably in the same plane as those of the corresponding notches in the other edge of the plate, and the plates of the two branches of the rear fork are of course strictly symmetrical, so that in adjusting, if the washers at the opposite ends of the axle are moved the same number of notches, the wheel must necessarily be in the same plane as before and special adjustment, or attention, to insure the wheel's being in the plane in which it is to advance is not required.

It is to be observed that, for the purpose of adjustment, this construction does not add to the number of pieces in the machine, and since the teeth are in effect added to the edge of the plate, it does not weaken it either by cutting or distorting the grain of the metal, but instead adds strength by means of the inbent arms, the flange, and the washer. This, especially when the axle is near the rear end of the slot, is a matter of importance. So, too, the weight added is almost inappreciable, both in fact and apparently.

What I claim is—

1. The combination with the slotted, axle-receiving plate having its edges substantially parallel to the slot and each provided with a series of transverse notches, of a washer having its central perforation registering with the slot and provided with teeth normally projecting across the edges of the plate in said notches.

2. The combination with a slotted axle-receiving plate with edges, parallel to the slot, each provided with a series of transverse notches, of a washer having its central aperture registering with said slot and having above and below arms whose ends are bent inward over said edges, respectively, and each provided with a marginal tooth to engage in the marginal notches.

3. The combination with the marginally notched, slotted plate, of the threaded axle passing through the plate in said slot, a stop secured to the axle contiguous to the plate, a washer, upon the opposite side of the plate, having above and below broad arms with ends bent over said edges, respectively, and each provided with a tooth arranged to slide into and out of engagement with the corresponding notches as the washer is moved bodily toward and away from the plate, and a nut working upon the threaded end of the axle to clamp the parts together.

In testimony whereof I affix my signature in presence of two witnesses.

ALBERT PERKINS.

Witnesses:
  CHAS. C. CANDY,
  DUFFIELD MILES.